United States Patent
Al-Shalash et al.

(10) Patent No.: US 9,554,264 B2
(45) Date of Patent: Jan. 24, 2017

(54) SYSTEM AND METHOD FOR SIGNALING NETWORK ASSIGNED RADIO RESOURCES FOR PROXIMITY DISCOVERY

(71) Applicant: Futurewei Technologies, Inc., Plano, TX (US)

(72) Inventors: Mazin Al-Shalash, Frisco, TX (US); Philippe Sartori, Algonquin, IL (US); Hossein Bagheri, Urbana, IL (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 39 days.

(21) Appl. No.: 14/612,135

(22) Filed: Feb. 2, 2015

(65) Prior Publication Data

US 2015/0223048 A1  Aug. 6, 2015

Related U.S. Application Data

(60) Provisional application No. 61/934,633, filed on Jan. 31, 2014.

(51) Int. Cl.
| | |
|---|---|
| *H04L 12/28* | (2006.01) |
| *H04W 8/00* | (2009.01) |
| *H04W 72/04* | (2009.01) |
| *H04W 4/00* | (2009.01) |
| *H04W 52/02* | (2009.01) |
| *H04W 76/02* | (2009.01) |

(52) U.S. Cl.
CPC ............. *H04W 8/005* (2013.01); *H04W 4/008* (2013.01); *H04W 52/0219* (2013.01); *H04W 72/0413* (2013.01); *H04W 76/023* (2013.01)

(58) Field of Classification Search
USPC ........................................................ 370/254
See application file for complete search history.

(56) References Cited

U.S. PATENT DOCUMENTS

| | | | |
|---|---|---|---|
| 9,325,483 B2* | 4/2016 | Karsi | ..................... H04L 5/0073 |
| 2010/0009675 A1 | 1/2010 | Wijting et al. | |
| 2013/0109301 A1 | 5/2013 | Hakola et al. | |
| 2013/0188546 A1 | 7/2013 | Turtinen et al. | |
| 2013/0288668 A1 | 10/2013 | Pragada et al. | |
| 2013/0294432 A1 | 11/2013 | Tsai et al. | |
| 2013/0308551 A1 | 11/2013 | Madan et al. | |
| 2013/0315079 A1 | 11/2013 | Edge | |
| 2014/0295832 A1* | 10/2014 | Ryu | ...................... H04W 48/16 455/434 |
| 2014/0334337 A1* | 11/2014 | Li | ......................... H04W 8/005 370/254 |

(Continued)

*Primary Examiner* — Mark Rinehart
*Assistant Examiner* — Angel Brockman
(74) *Attorney, Agent, or Firm* — Slater Matsil, LLP

(57) ABSTRACT

An eNB is configured to perform different methods for assigning discovery resources. One method includes receiving a request for discovery resources from an announcing user equipment (UE); allocating a plurality of discovery resources in response to the request; and transmitting a message indicating the plurality of discovery resources, the transmitted message configured to be used by a monitoring UE to determine which discovery resources to monitor. In some embodiments, this may include updating a message to indicate which discovery resources have been allocated, and broadcasting the updated message to a plurality of UEs including the monitoring UE.

24 Claims, 5 Drawing Sheets

(56) References Cited

U.S. PATENT DOCUMENTS

| | | | |
|---|---|---|---|
| 2015/0079906 A1* | 3/2015 | Koo | H04W 4/008 455/41.2 |
| 2015/0223243 A1* | 8/2015 | Tabet | H04W 28/085 370/330 |
| 2016/0021483 A1* | 1/2016 | Wei | H04W 4/005 455/41.2 |

* cited by examiner

SYSTEM AND METHOD FOR SIGNALING NETWORK ASSIGNED RADIO RESOURCES FOR PROXIMITY DISCOVERY

CROSS-REFERENCE TO RELATED APPLICATION(S) AND CLAIM OF PRIORITY

This application claims priority under 35 U.S.C. §119(e) to U.S. Provisional Patent Application No. 61/934,633, filed Jan. 31, 2014, entitled "METHOD AND PROCEDURE FOR NETWORK-ASSIGNED RADIO RESOURCES FOR PROXIMITY DISCOVERY", which is hereby incorporated by reference into this application as if fully set forth herein.

TECHNICAL FIELD

The present disclosure relates generally to wireless communications, and more particularly, to a system and method for signaling network assigned radio resources for proximity discovery.

BACKGROUND

Proximity discovery is one of the main features of device to device (D2D) services. To facilitate proximity discovery, one device announces a discovery message or signal, and another device monitors for this discovery message or signal. In order for the monitoring device to discover the proximity of the announcing device, it must receive and decode the discovery message or signal. In order for this process to be successful, both announcing and monitoring devices must know which radio resources will be used to transmit the discovery signal or message. In a cellular network the allocation of radio resources for the transmission of the discovery signal/message is done by the network.

In 3GPP LTE Release 12, two types of discovery resource allocation are supported. In Type 1, announcing user equipment (UEs) autonomously select resources from a transmission (TX) discovery pool to transmit their discovery messages. The pool of possible discovery resources for Type 1 is allocated by the serving eNodeB (eNB). In Type 2, announcing UEs request, and are assigned, transmission resources by the serving eNB. For both of these types, a monitoring UE must wake up and monitor all discovery resources allocated by the eNB, regardless if there is a UE announcing a discovery message/signal in each particular resource. This procedure is energy inefficient, and wastes UE battery life.

SUMMARY

According to one embodiment, there is provided a method for assigning discovery resources at a first eNB. The method includes receiving a request for discovery resources from an announcing user equipment (UE); allocating a plurality of discovery resources in response to the request; and transmitting a message indicating the plurality of discovery resources, the transmitted message configured to be used by a monitoring UE to determine which discovery resources to monitor.

According to another embodiment, there is provided a method for using network assigned discovery resources at a monitoring UE. The method includes receiving, from a first eNB, a message indicating a plurality of discovery resources to be used by an announcing UE for discovery announcing; and decoding the message to determine which discovery resources to monitor.

According to yet another embodiment, there is provided a first eNB configured for assigning discovery resources. The first eNB includes at least one memory, and at least one processor coupled to the at least one memory. The at least one processor is configured to control the serving eNB to receive a request for discovery resources from an announcing user equipment (UE); allocate a plurality of discovery resources in response to the request; and transmit a message indicating the plurality of discovery resources, the transmitted message configured to be used by a monitoring UE to determine which discovery resources to monitor.

According to still another embodiment, there is provided a monitoring user equipment (UE) configured for using network assigned discovery resources. The monitoring UE includes at least one memory, and at least one processor coupled to the at least one memory. The at least one processor is configured to control the monitoring UE to receive, from a first eNB, a message indicating a plurality of discovery resources to be used by an announcing UE for discovery announcing; and decode the message to determine which discovery resources to monitor.

Other technical features may be readily apparent to one skilled in the art from the following figures, descriptions, and claims.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which.

DETAILED DESCRIPTION

Figure 1:
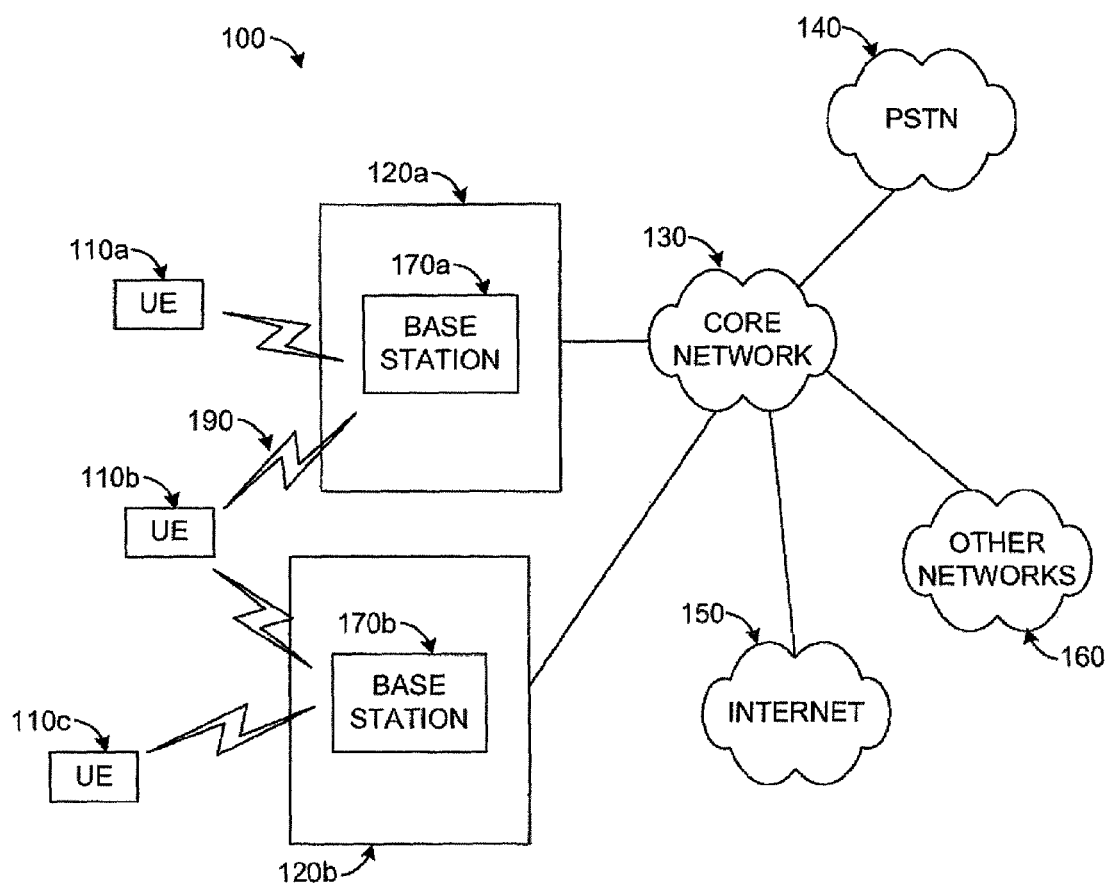
FIG. 1 illustrates an example communication system that may be used for implementing the devices and methods disclosed herein.

FIGS. 1 through 5, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

In the context of 3GPP RAN working groups, two approaches have been discussed for the allocation of discovery radio resources for proximity discovery (ProSe). In Type 1, the network allocates a pool of discovery resources to be shared among different announcing user equipment (UEs). In Type 2, the network assigns specific discovery resources to a particular announcing UE.

For Type 1 discovery resource allocation, an announcing UE must contend with other announcing UEs for the use of specific radio resources from the assigned resource pool.

Therefore, with Type 1, different devices may transmit their discovery signal/message on the same radio resource, leading to a collision and loss of discovery performance. As there is no assignment of discovery resources, such collisions cannot be totally prevented for Type 1. Furthermore, since a monitoring UE cannot coordinate with the announcing UE a priori, the monitoring UE does not know in which resource the announcing UE will transmit its discovery signal/message. Therefore, with Type 1, a monitoring UE must try to blindly decode all possible locations for the discovery signal/message, to maintain a high success rate for discovery. This in turn has a negative impact on the power consumption of the monitoring device.

With Type 2 discovery resource allocation, the network assigns specific resources to an announcing UE to transmit its discovery signal/message. Therefore, collision of discovery signals/messages can be prevented through the appropriate management of discovery resources by the network. Furthermore, the network can inform monitoring devices of which discovery resources have been allocated in a particular geographical locale. This enables monitoring devices to only decode discovery resources which have been allocated to announcing devices. This way a monitoring UE can minimize its power consumption by not needing to decode all discovery resources.

Embodiments of this disclosure provide systems and methods for network-assigned radio resources for proximity discovery between mobile wireless devices. The methods comprise the network assigning discovery resources in response to a request from an announcing device and efficient signaling of the assigned discovery resources to monitoring devices for Type 2 discovery.

Multiple embodiments of how assigned resources can be signaled to monitoring devices are described. In some embodiments, a list of discovery resources assigned by a wireless transmitter (e.g., base station) is broadcast by the wireless transmitter. Any monitoring device entering into the coverage of the wireless transmitter receives and decodes this broadcast list. Based on the information in this list, a monitoring device can attempt to receive and decode transmissions in the indicated discovery resources of discovery signals or messages from announcing devices.

In some embodiments, the network communicates, to a specific list of monitoring devices, the discovery resources it has allocated to a specific announcing device. This list may comprise a buddy list authorized to discover the announcing device (e.g., in a social networking application). This targeted communication of the announcing device's discovery resources may include monitoring devices under the coverage of the same wireless transmitter, or other transmitters. Here the monitoring device may recognize the identifier of the wireless transmitter that made the discovery resource assignment, and only try to decode a discovery signal/message if it subsequently enters the coverage of that wireless transmitter.

In some embodiments, the monitoring UE may be able to decode the discovery signal/message if it is in an area adjacent to, but outside of, the coverage of the wireless transmitter that made the discovery resource assignment. It may rely on further information from the network (e.g. a neighbor list) or other sources (e.g., location information) to determine when to monitor for a discovery signal/message on a specific discovery resource.

FIG. 1 illustrates an example communication system 100 that may be used for implementing the devices and methods disclosed herein. In general, the system 100 enables multiple wireless users to transmit and receive data and other content.

The system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA).

In this example, the communication system 100 includes user equipment (UE) 110a-110c, radio access networks (RANs) 120a-120b, a core network 130, a public switched telephone network (PSTN) 140, the Internet 150, and other networks 160. While certain numbers of these components or elements are shown in FIG. 1, any number of these components or elements may be included in the system 100.

The UEs 110a-110c are configured to operate and/or communicate in the system 100. For example, the UEs 110a-110c are configured to transmit and/or receive wireless signals. Each UE 110a-110c represents any suitable end user device and may include such devices (or may be referred to) as a user equipment/device (UE), wireless transmit/receive unit (WTRU), mobile station, fixed or mobile subscriber unit, pager, cellular telephone, personal digital assistant (PDA), smartphone, laptop, computer, touchpad, wireless sensor, or consumer electronics device.

The RANs 120a-120b here include base stations 170a-170b, respectively. Each base station 170a-170b is configured to wirelessly interface with one or more of the UEs 110a-110c to enable access to the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home NodeB, a Home eNodeB, a site controller, an access point (AP), a wireless router, a server, a switch, or any other suitable processing entity with a wired or wireless network.

In the embodiment shown in FIG. 1, the base station 170a forms part of the RAN 120a, which may include other base stations, elements, and/or devices. Also, the base station 170b forms part of the RAN 120b, which may include other base stations, elements, and/or devices. Each base station 170a-170b operates to transmit and/or receive wireless signals within a particular geographic region or area, sometimes referred to as a "cell." In some embodiments, multiple-input multiple-output (MIMO) technology may be employed having multiple transceivers for each cell.

The base stations 170a-170b communicate with one or more of the UEs 110a-110c over one or more air interfaces 190 using wireless communication links. The air interfaces 190 may utilize any suitable radio access technology.

It is contemplated that the system 100 may use multiple channel access functionality, including such schemes as described herein. In particular embodiments, the base stations 170a-170b and UEs 110a-110c are configured to implement LTE, LTE-A, and/or LTE-B. Additionally, in accordance with this disclosure, one or more of the base stations 170a-170b and UEs 110a-110c are configured to communicate to facilitate network assignment of radio resources for proximity discovery. Of course, other multiple access schemes and wireless protocols may be utilized.

The RANs 120a-120b are in communication with the core network 130 to provide the UEs 110a-110c with voice, data, application, Voice over Internet Protocol (VoIP), or other services. Understandably, the RANs 120a-120b and/or the core network 130 may be in direct or indirect communication with one or more other RANs (not shown). The core network 130 may also serve as a gateway access for other networks (such as PSTN 140, Internet 150, and other networks 160). In addition, some or all of the UEs 110a-110c may include functionality for communicating with different wireless networks over different wireless links using different wireless technologies and/or protocols.

Although FIG. 1 illustrates one example of a communication system, various changes may be made to FIG. 1. For example, the communication system 100 could include any number of UEs, base stations, networks, or other components in any suitable configuration.

Figure 2A:
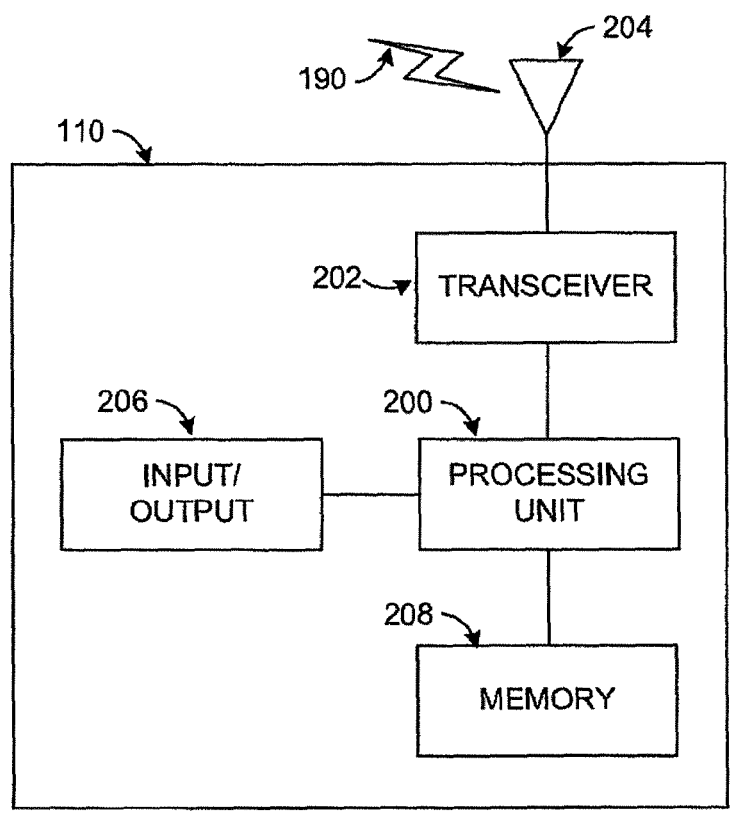
FIGS. 2A and 2B illustrate example devices that may be used for implementing the methods and teachings disclosed herein.
Figure 2B:
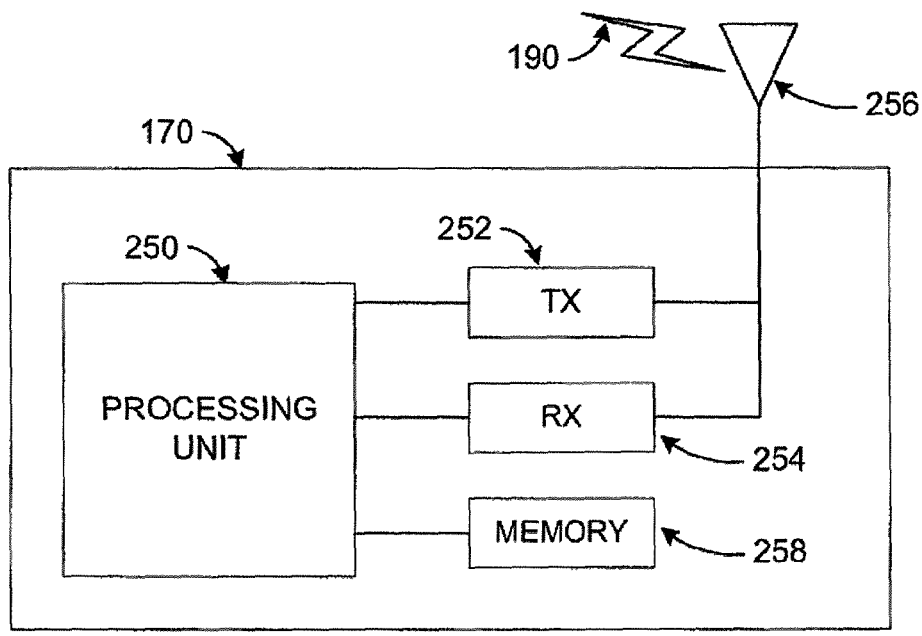

FIGS. 2A and 2B illustrate example devices that may be used for implementing the methods and teachings disclosed herein. In particular, FIG. 2A illustrates an example UE 110, and FIG. 2B illustrates an example base station 170. These components could be used in the system 100 or in any other suitable system.

As shown in FIG. 2A, the UE 110 includes at least one processing unit 200. The processing unit 200 implements various processing operations of the UE 110. For example, the processing unit 200 could perform signal coding, data processing, power control, input/output processing, or any other functionality enabling the UE 110 to operate in the system 100. The processing unit 200 also supports the methods and teachings described in more detail below. For example, the processing unit 200 is configured to control or support operations of the UE 110 according to the proximity discovery standards and principles described below. Each processing unit 200 includes any suitable processing or computing device configured to perform one or more operations. Each processing unit 200 could, for example, include a microprocessor, microcontroller, digital signal processor, field programmable gate array, or application specific integrated circuit.

The UE 110 also includes at least one transceiver 202. The transceiver 202 is configured to modulate data or other content for transmission by at least one antenna 204. The transceiver 202 is also configured to demodulate data or other content received by the at least one antenna 204. Each transceiver 202 includes any suitable structure for generating signals for wireless transmission and/or processing signals received wirelessly. Each antenna 204 includes any suitable structure for transmitting and/or receiving wireless signals. One or multiple transceivers 202 could be used in the UE 110, and one or multiple antennas 204 could be used in the UE 110. Although shown as a single functional unit, a transceiver 202 could also be implemented using at least one transmitter and at least one separate receiver.

The UE 110 further includes one or more input/output devices 206. The input/output devices 206 facilitate interaction with a user. Each input/output device 206 includes any suitable structure for providing information to or receiving information from a user, such as a speaker, microphone, keypad, keyboard, display, or touch screen.

In addition, the UE 110 includes at least one memory 208. The memory 208 stores instructions and data used, generated, or collected by the UE 110. For example, the memory 208 could store software or firmware instructions executed by the processing unit(s) 200 and data used to reduce or eliminate interference in incoming signals. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 2B, the base station 170 includes at least one processing unit 250, at least one transmitter 252, at least one receiver 254, one or more antennas 256, and at least one memory 258. The processing unit 250 implements various processing operations of the base station 170, such as signal coding, data processing, power control, input/output processing, or any other functionality. The processing unit 250 can also support the methods and teachings described in more detail below. For example, the processing unit 250 is configured to control or support operations of the base station 170 according to the proximity discovery standards and principles described below. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more UEs or other devices. Each receiver 254 includes any suitable structure for processing signals received wirelessly from one or more UEs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s).

Additional details regarding UEs 110 and base stations 170 are known to those of skill in the art. As such, these details are omitted here for clarity.

In Type 2 discovery, the specific discovery resources used by the announcing UE are assigned by the network. Type 2 discovery includes Type 2a discovery and Type 2b discovery. In Type 2a, the announcing UE is allocated one or more discovery resources, which may include a sequence of discovery resources to transmit, and for a specific time interval. In Type 2b, a periodic resource is assigned to the UE indefinitely. The advantages of Type 2 discovery resource allocation include better interference management (protection from discovery signal collisions), and reduction in UE power consumption.

With Type 2 discovery, a monitoring UE does not need to decode all discovery resources. This is because the network can signal to the monitoring UE which discovery resources have been assigned in each serving cell, and hence the monitoring UE does not need to decode unoccupied (unassigned) discovery resources. Furthermore, since the network assigns discovery resources, the allocation of these resources can be optimized so as to minimize the number of discovery subframes a monitoring UE needs to decode. This can be achieved by efficiently packing assigned discovery resources in discovery subframes.

With Type 2 discovery, a monitoring UE can save power by not attempting to decode unassigned discovery resources. The network can optimize the allocation of discovery resources so as to minimize the power consumption of monitoring UEs. Of course, informing monitoring UEs of assigned discovery resources may come at the cost of additional signaling. A number of methods can be used to signal assigned discovery resources to monitoring UEs.

Figure 3:
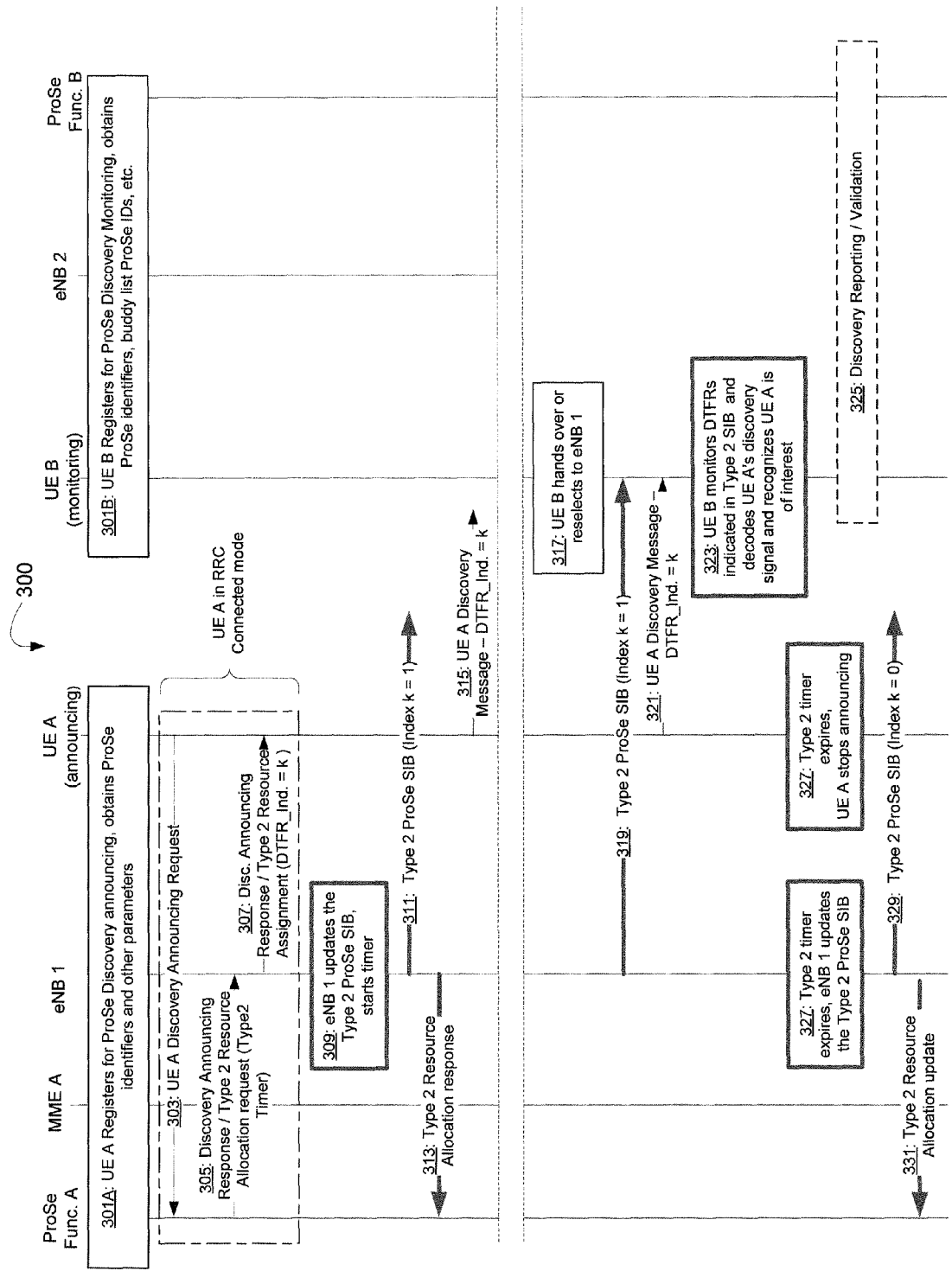
FIG. 3 illustrates an example method for Type 2 inter-cell open discovery resource allocation according to this disclosure.

FIG. 3 illustrates an example method for Type 2 inter-cell open discovery resource allocation according to this disclosure. The method 300 may be performed in association with one or more components of the system 100 of FIG. 1. However, the method 300 could be performed using any other suitable system.

Initially, at steps 301A-301B, UE A and UE B (which may represent different UEs among the UEs 110a-110c in FIG. 1) register for ProSe discovery. In particular, at step 301A, UE A registers for ProSe discovery announcement, which may include obtaining one or more ProSe identifiers and other parameters. At step 301B, UE B registers for ProSe discovery monitoring, which may include obtaining one or more ProSe identifiers, one or more buddy list ProSe identifiers, and the like.

Some time after registering for ProSe Discovery announcement, UE A determines to start announcing its discovery message. This may be triggered by some action of the end user, such as activation of a ProSe-enabled application, or some other action. At step 303, UE A connects to the network and sends a message to request the assignment of a discovery resource (e.g., a Discovery Announcing Request).

At step 305, the EPC (Enhanced Packet Core) (e.g., ProSe Function A, a ProSe server) responds with a message to assign discovery resources (e.g., a Discovery Announcing Response). The network also requests eNB 1 (the serving eNB) to assign a Type 2 discovery resource to UE A with an appropriate message (e.g., a Type2 Resource Allocation Request message). This message includes a timer for this resource allocation (e.g., a Type2 Timer). It is noted that for Type 2b, the value of the Type2 Timer may take a particular value indicating indefinite allocation.

At step 307, eNB 1 assigns a set of discovery time/frequency resources (DTFR_Index=k) to UE A via an appropriate assignment message (e.g., a Type2 Resource Assignment message). This message includes the assignment timer. Also, the Discovery Announcing Response message (or similar message) from the EPC can be passed transparently to UE A. During steps 303-307, UE A is in RRC Connected mode.

At step 309, eNB 1 may update an appropriate broadcast message (e.g., a Type2 ProSe SIB system information block) to indicate that the specific discovery time/frequency resource (DTFR) (DTFR_Index k) has been assigned. Also at step 309, eNB 1 starts a timer for this assignment. At step 311, eNB 1 broadcasts the updated Type2 ProSe SIB (or similar message) with the DTFRs to be monitored to include the DTFR referenced by index k (e.g., Index k=1). At step 313, eNB 1 may send an appropriate response message to the EPC (e.g., a Type2 Resource Allocation response), acknowledging the assignment request (e.g., a Type2 Resource Allocation Request, or similar message).

At step 315, UE A starts to announce its discovery message on the assigned discovery time/frequency resource (DTFR). It continues to announce on the assigned discovery resources until the assignment timer expires.

At step 317, a monitoring UE (UE B) enters into the coverage area of eNB 1 due to a handover or cell reselection. Of course, step 317 could occur even before UE A started announcing (step 315).

At step 319, UE B receives the Type2 SIB (or similar message) broadcast by eNB 1, and extracts the set of discovery resources to monitor for Type 2 discovery messages. At step 321, having recognized that the discovery resource with index k is assigned for open discovery, UE B monitors the appropriate discovery resource and decodes UE A's discovery message announced in operation 315. At step 323, UE B recognizes that UE A is of interest, and completes the discovery process (e.g., through discovery reporting and validation with UE B's Proximity Function or Proximity server in step 325).

For Type 2a, at some point, the allocation timer (e.g., Type2 timer or similar) will expire at step 327. This may trigger eNB 1 to update its broadcast message (e.g., Type2 ProSe SIB) to indicate that the DTFR with Index k is no longer assigned (Index k=0) (step 329). Concurrently, the allocation timer expires on UE A, and UE A stops announcing its discovery signal. At step 331, eNB 1 may send a Type 2 Resource Allocation Update (or similar message) to the EPC, indicating that the discovery resource for UE A has been released.

Figure 4:
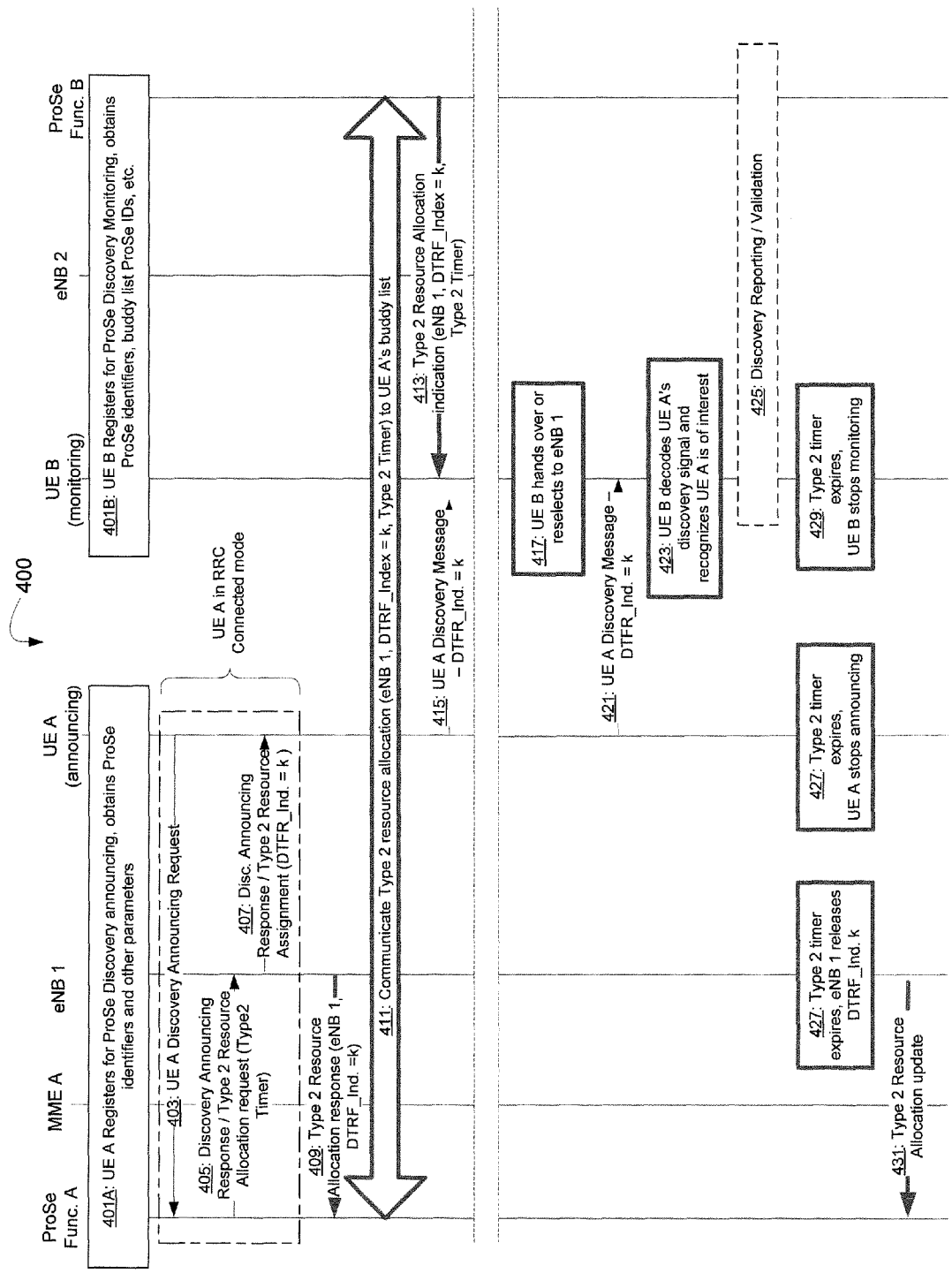
FIG. 4 illustrates an example method for Type 2 restricted discovery resource allocation according to this disclosure.

FIG. 4 illustrates an example method for Type 2 restricted discovery resource allocation according to this disclosure. The method 400 may be performed in association with one or more components of the system 100 of FIG. 1. However, the method 400 could be performed using any other suitable system.

The method 400 is very similar to the open discovery method 300 in FIG. 3. In particular, steps 401A-407, 415, and 431 are the same as or similar to corresponding steps 301A-307, 315, and 331 in FIG. 3. Thus, a detailed description of these operations will not be repeated here. However, there are some differences between the method 400 and the method 300.

At step 409, eNB 1 (the serving eNB) reports the allocated discovery resource (e.g., DTFR_Index=k) to the announcing UE's ProSe function, ProSe Function A (e.g., a ProSe server). Then, at step 411, ProSe Function A communicates the Type 2 resource allocation (the serving eNB, the discovery resource index, and the duration of the discovery resource allocation (e.g., Type2 Timer)) to the MMEs and eNBs on UE A's buddy list. Unicast signaling is used to update buddy-list UEs with information regarding the Type 2 resources allocated to UE A. For example, at step 413, ProSe Function B communicates the Type 2 resource allocation indication to UE B (the monitoring UE).

At step 417, before the expiry of the allocation timer, UE B enters the coverage of eNB 1, and at step 421, UE B starts to monitor for announcements on the resource allocated by eNB 1 to announcing UEs in its buddy list (e.g., DTFR_Index=k). At this point, proximity discovery may occur at steps 421-425. Later, if the discovery resource allocation timer (e.g., Type2 Timer) expires (steps 427-429), not only the announcing UE (UE A) but also the monitoring UE (UE B) stop ProSe discovery. In addition, at step 427, the eNB serving the announcing UE (eNB 1) releases the reserved discovery resources. The eNB 1 may provide an update of the discovery resource allocated or deallocated for UE A to UE A's ProSe function at step 431.

It is noted that the open discovery method 300 can also be used for restricted discovery, as well as open discovery. However, the restricted discovery method 400 may be more energy efficient for restricted discovery. In particular, if the open discovery method 300 is used for both open and restricted discovery, a monitoring UE would monitor and decode all discovery resources indicated as assigned by the eNB in a broadcast message (e.g., a ProSe SIB). Therefore, with open discovery method 300, a monitoring UE expends more energy decoding all Type2 discovery messages, both open and restricted. This increased energy consumption in the open discovery method 300 can be balanced against the increased signaling associated with the restricted discovery method 400.

For Type 2 open discovery, the serving eNB can also broadcast a list of discovery resources assigned by neighboring cells, in order to facilitate inter-cell discovery. Since Type 2 dynamically allocates discovery resources to UEs, the neighboring eNBs can be updated as the allocation changes. Such information exchange may entail new messaging between neighboring eNBs (e.g., over the LTE X2 interface that connects neighboring eNBs, as known in the art), as will now be described.

Figure 5:
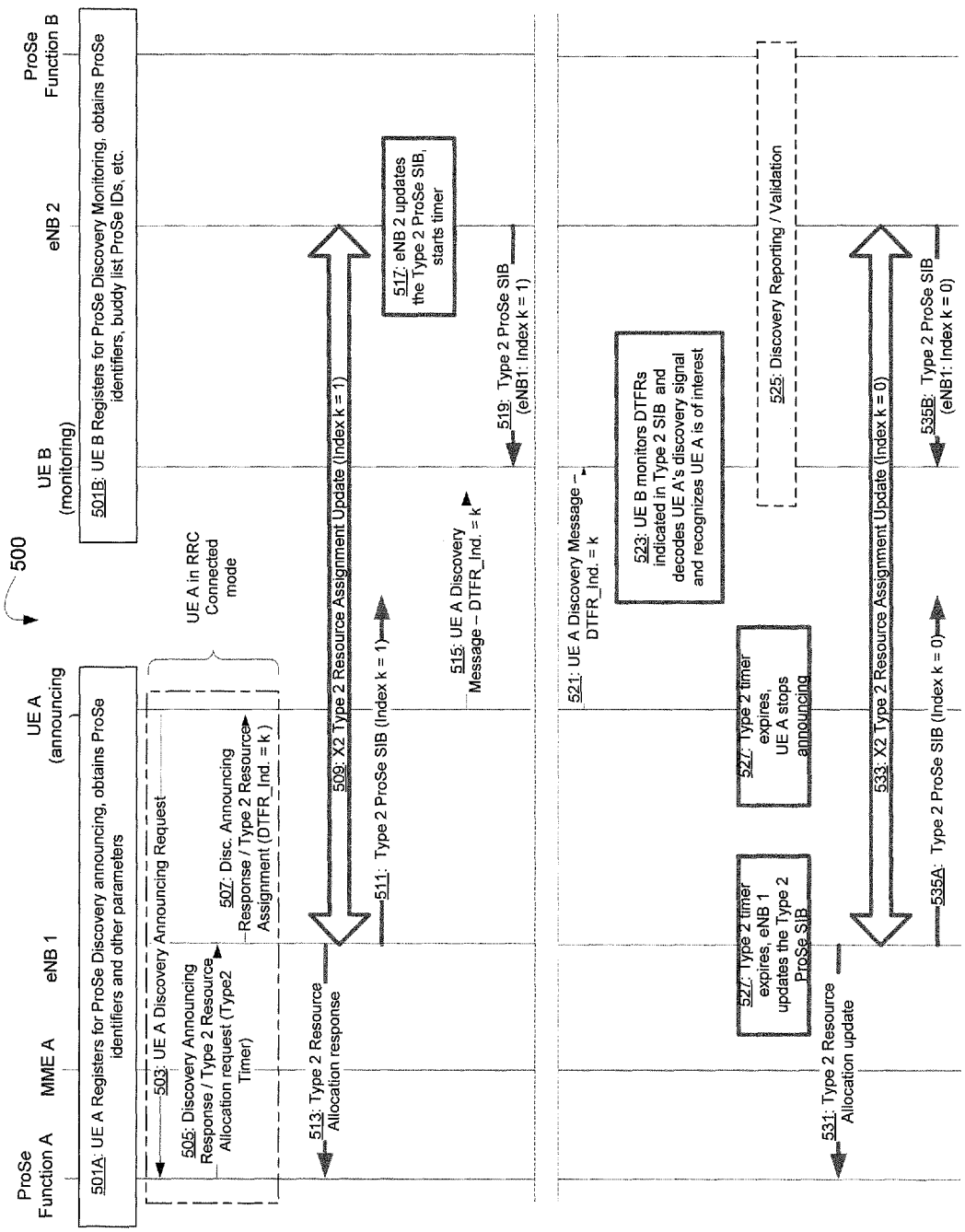
FIG. 5 illustrates an example method for Type 2 inter-cell open discovery resource allocation using resources assigned by neighboring cells according to this disclosure.

FIG. 5 illustrates an example method for Type 2 inter-cell open discovery resource allocation using resources assigned by neighboring cells according to this disclosure. The method 500 may be performed in association with one or more components of the system 100 of FIG. 1. However, the method 500 could be performed using any other suitable system.

The method 500 is very similar to the open discovery method 300 in FIG. 3. In particular, steps 501A-507, 513-517, and 523-531 are the same as or similar to corresponding steps 301A-307, 313-317, and 323-331 in FIG. 3. Thus, a detailed description of these operations will not be repeated here. However, there are some differences between the method 500 and the method 300.

At step 509, the resources assigned by eNB 1 (the serving eNB) for Type 2 discovery are communicated to neighboring eNBs (including eNB 2) over an appropriate interface (e.g., the X2 interface). At step 511, eNB 1 broadcasts the assigned discovery resources to be monitored by monitoring UEs (e.g., with DTFR_Index k=1). In addition, the neighboring eNBs also broadcast the assigned resources allocated by eNB 1. For example, at step 519, eNB 2 broadcasts the assigned discovery resources in an appropriate broadcast message (e.g., Type 2 ProSe SIB message). This alerts UE B to monitor discovery resources allocated by eNB 1 (e.g., resource k from eNB 1), where the discovery message of UE A is received (step 521). Note that once eNB 1 releases the discovery resources for UE A, this may again be communicated to neighboring eNB 2(step 533). At steps 535A-535B, eNB 1 and eNB 2 broadcast the updated assigned discovery resources in an appropriate broadcast message (e.g., Type 2 ProSe SIB message).

Although FIGS. 3 through 5 illustrate example methods for inter-cell discovery resource allocation, various changes may be made to the figures. For example, while shown as a series of steps, various steps shown in FIGS. 3 through 5 could overlap, occur in parallel, occur in a different order, or occur multiple times. Moreover, some steps could be combined or removed and additional steps could be added according to particular needs. Also, one or more principles of the methods 300-500 could be applicable for discovery resource selection through contention of different devices (e.g., Type 1 discovery resource selection).

In some embodiments, some or all of the functions or processes of the one or more of the devices are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The terms "include" and "comprise," as well as derivatives thereof, mean inclusion without limitation. The term "or" is inclusive, meaning and/or. The phrases "associated with" and "associated therewith," as well as derivatives thereof, mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method for assigning discovery resources at a first eNodeB (eNB), the method comprising:
   receiving a request for discovery resources from an announcing user equipment (UE);
   allocating a plurality of discovery resources in response to the request;
   determining a timer for the plurality of discover resources;
   transmitting a message indicating the plurality of discovery resources and the timer for the plurality of discovery resources, the transmitted message configured to be used by a monitoring UE to determine which discovery resources to monitor;
   running an allocation timer on the first eNB concurrently with the timer being run on the monitoring UE; and
   transmitting a second message indicating that the plurality of discovery resources are no longer available in response to the allocation timer expiring.

2. The method of claim 1, wherein:
   allocating the plurality of discovery resources further comprises updating the message to indicate which discovery resources have been allocated; and
   transmitting the updated message indicating the plurality of discovery resources further comprises broadcasting the updated message to a plurality of UEs including the monitoring UE.

3. The method of claim 2, wherein the updated message is a proximity service (ProSe) system information block (SIB).

4. The method of claim 1, wherein transmitting the message indicating the plurality of discovery resources further comprises:
   reporting the allocated discovery resources to a ProSe server associated with the announcing UE, the reported allocated discovery resources configured to be transmitted by the ProSe server to a plurality of UEs in a buddy list associated with the announcing UE.

5. The method of claim 1, wherein transmitting the message indicating the plurality of discovery resources comprises:
   transmitting the message to at least one neighboring eNB over an inter-eNB interface; and
   wherein the at least one neighboring eNB is configured to update the message to indicate which discovery resources have been allocated by the first eNB and to identify the first eNB, the at least one neighboring eNB further configured to broadcast the updated message to a plurality of UEs including the monitoring UE.

6. The method of Claim 5, wherein the inter-eNB interface is a Long Term Evolution (LTE) X2 interface.

7. The method of Claim 5, wherein the updated message is a ProSe system information block (SIB).

8. A method for using network assigned discovery resources at a monitoring user equipment (UE), the method comprising:

receiving, from a first eNodeB (eNB), a message indicating a plurality of discovery resources and a timer for the plurality of discovery resources, to be used by an announcing UE for discovery announcing;

decoding the message to determine which discovery resources to monitor;

running, on the monitoring UE, the timer in response to receiving the timer, wherein the timer runs concurrently with an allocation timer on the first eNB; and announcing, on the plurality of discovery resources, until the timer expires.

9. The method of claim 8, wherein receiving the message indicating the plurality of discovery resources comprises:

receiving a message broadcast by the first eNB to a plurality of UEs including the monitoring UE, the broadcast message comprising an indication of which discovery resources have been allocated by the first eNB; and extracting the indication of the discovery resources from the broadcast message.

10. The method of Claim 9, wherein the broadcast message is a proximity service (ProSe) system information block (SIB).

11. The method of claim 8, wherein receiving the message indicating the plurality of discovery resources comprises:

receiving, from a ProSe server associated with the monitoring UE, discovery resource information, transmitted from the ProSe server associated with the announcing UE, to a plurality of UEs in a buddy list associated with the announcing UE.

12. The method of claim 8, wherein receiving the message indicating the plurality of discovery resources comprises:

receiving the message from a neighboring eNB after the neighboring eNB receives discovery resource information from the first eNB over an inter-eNB interface.

13. A first eNodeB (eNB) configured for assigning discovery resources, the first eNB comprising:

at least one memory; and at least one processor coupled to the at least one memory, the at least one processor configured to control the first eNB to:

receive a request for discovery resources from an announcing user equipment (UE);

allocate a plurality of discovery resources in response to the request;

determine a timer for the plurality of discovery resources;

transmit a message indicating the plurality of discovery resources and the timer for the plurality of discovery resources, the transmitted message configured to be used by a monitoring UE to determine which discovery resources to monitor;

run an allocation timer on the first eNB concurrently with the timer being run on the monitoring UE; and transmit a second message indicating that the plurality of discovery resources are no longer available, in response to the allocation timer expiring.

14. The first eNB of claim 13, wherein the at least one processor is configured to control the first eNB to:

allocate the plurality of discovery resources by updating a message to indicate which discovery resources have been allocated; and transmit the updated message indicating the plurality of discovery resources by broadcasting the updated message to a plurality of UEs including the monitoring UE.

15. The first eNB of claim 14, wherein the updated message is a proximity service (ProSe) system information block (SIB).

16. The first eNB of claim 13, wherein the at least one processor is configured to control the first eNB to transmit the message indicating the plurality of discovery resources by:

reporting the allocated discovery resources to a ProSe server associated with the announcing UE, the reported allocated discovery resources configured to be transmitted by the ProSe server to a plurality of UEs in a buddy list associated with the announcing UE.

17. The first eNB of claim 13, wherein the at least one processor is configured to control the first eNB to transmit the message indicating the plurality of discovery resources by:

transmitting the message to at least one neighboring eNB over an inter-eNB interface; and wherein the at least one neighboring eNB is configured to update the message to indicate which discovery resources have been allocated by the first eNB and to identify the first eNB, the at least one neighboring eNB further configured to broadcast the updated message to a plurality of UEs including the monitoring UE.

18. The first eNB of claim 17, wherein the inter-eNB interface is a Long Term Evolution (LTE) X2 interface.

19. The first eNB of claim 17, wherein the updated message is a ProSe system information block (SIB).

20. A monitoring user equipment (UE) configured for using network assigned discovery resources, the monitoring UE comprising:

at least one memory; and at least one processor coupled to the at least one memory, the at least one processor configured to control the monitoring UE to:

receive, from a first eNodeB (eNB), a message indicating a plurality of discovery resources and a timer for the plurality of discovery resources, to be used by an announcing UE for discovery announcing;

decode the message to determine which discovery resources to monitor;

run the timer on the monitoring UE, in response to receiving the timer, wherein the timer runs concurrently with an allocation timer being run on the first eNB; and announce, on the plurality of discovery resources, until the timer expires.

21. The monitoring UE of claim 20, wherein the at least one processor is configured to control the monitoring UE to receive the message indicating the plurality of discovery resources by:

receiving a message broadcast by the first eNB to a plurality of UEs including the monitoring UE, the broadcast message comprising an indication of which discovery resources have been allocated by the first eNB; and extracting the indication of the discovery resources from the broadcast message.

22. The monitoring UE of claim 21, wherein the broadcast message by the first eNB is a proximity service (ProSe) system information block (SIB).

23. The monitoring UE of claim 20, wherein the at least one processor is configured to control the monitoring UE to receive the message indicating the plurality of discovery resources by:

receiving, from a ProSe server associated with the monitoring UE, discovery resource information transmitted from the ProSe server associated with the announcing UE, to a plurality of UEs in a buddy list associated with the announcing UE.

24. The monitoring UE of claim 20, wherein the at least one processor is configured to control the monitoring UE to receive the message indicating the plurality of discovery resources by:
   receiving the message from a neighboring eNB after the neighboring eNB receives discovery resource information from the first eNB over an inter-eNB interface.

\* \* \* \* \*